Aug. 22, 1944.  E. O. KOLLMORGEN  2,356,488
MACHINE FOR BEVELLING THE EDGES OF LENSES
Filed June 30, 1942  4 Sheets-Sheet 4

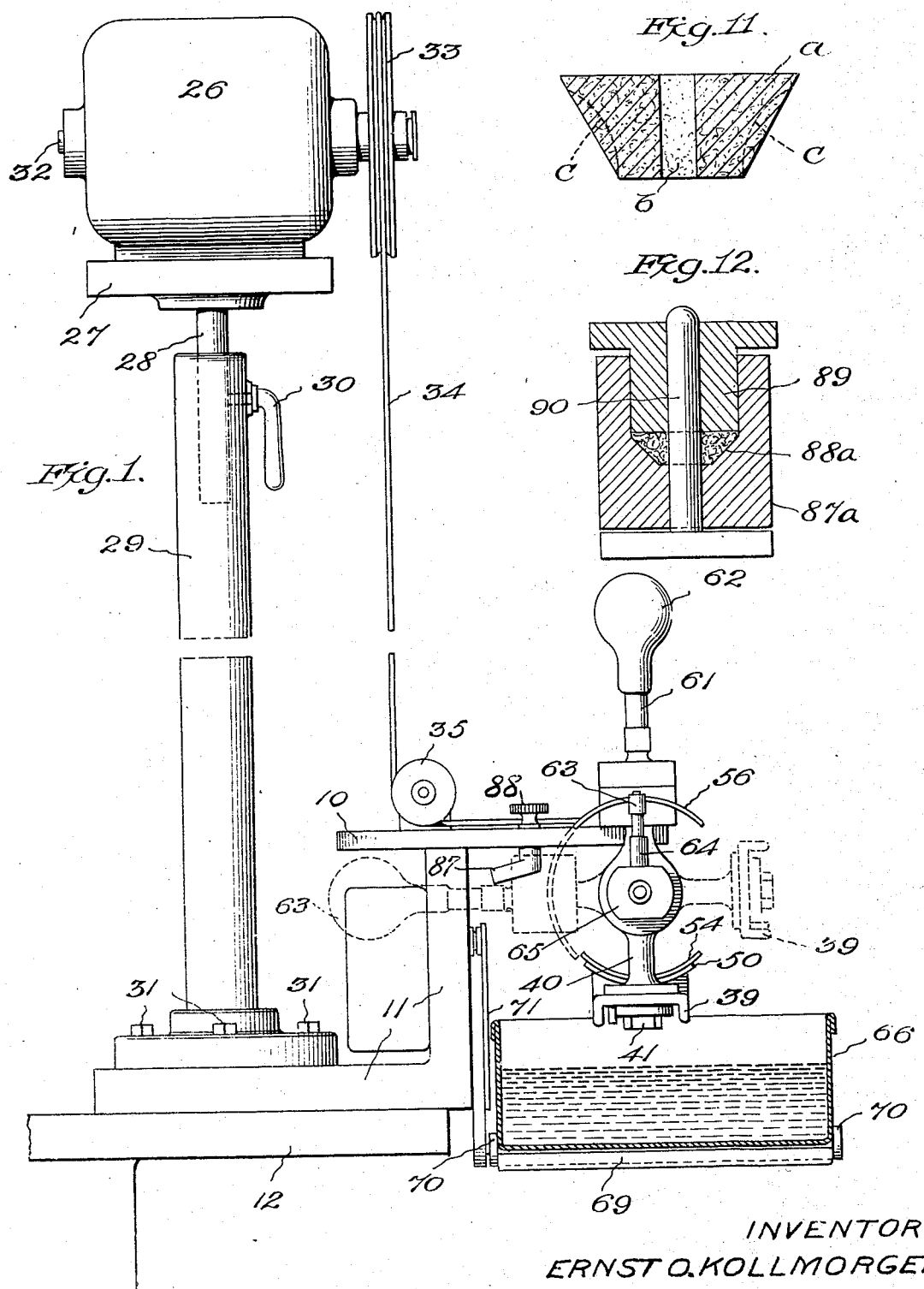

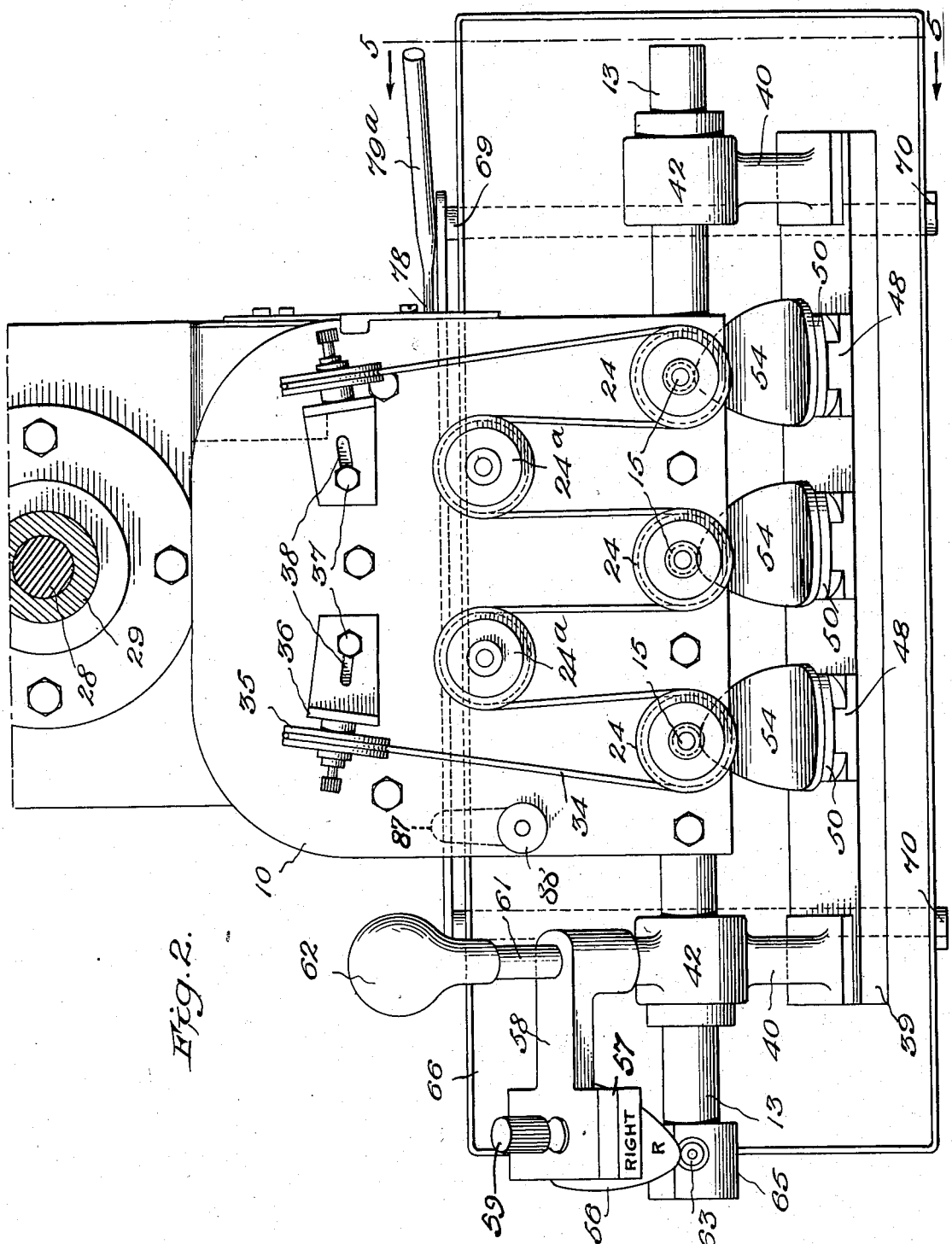

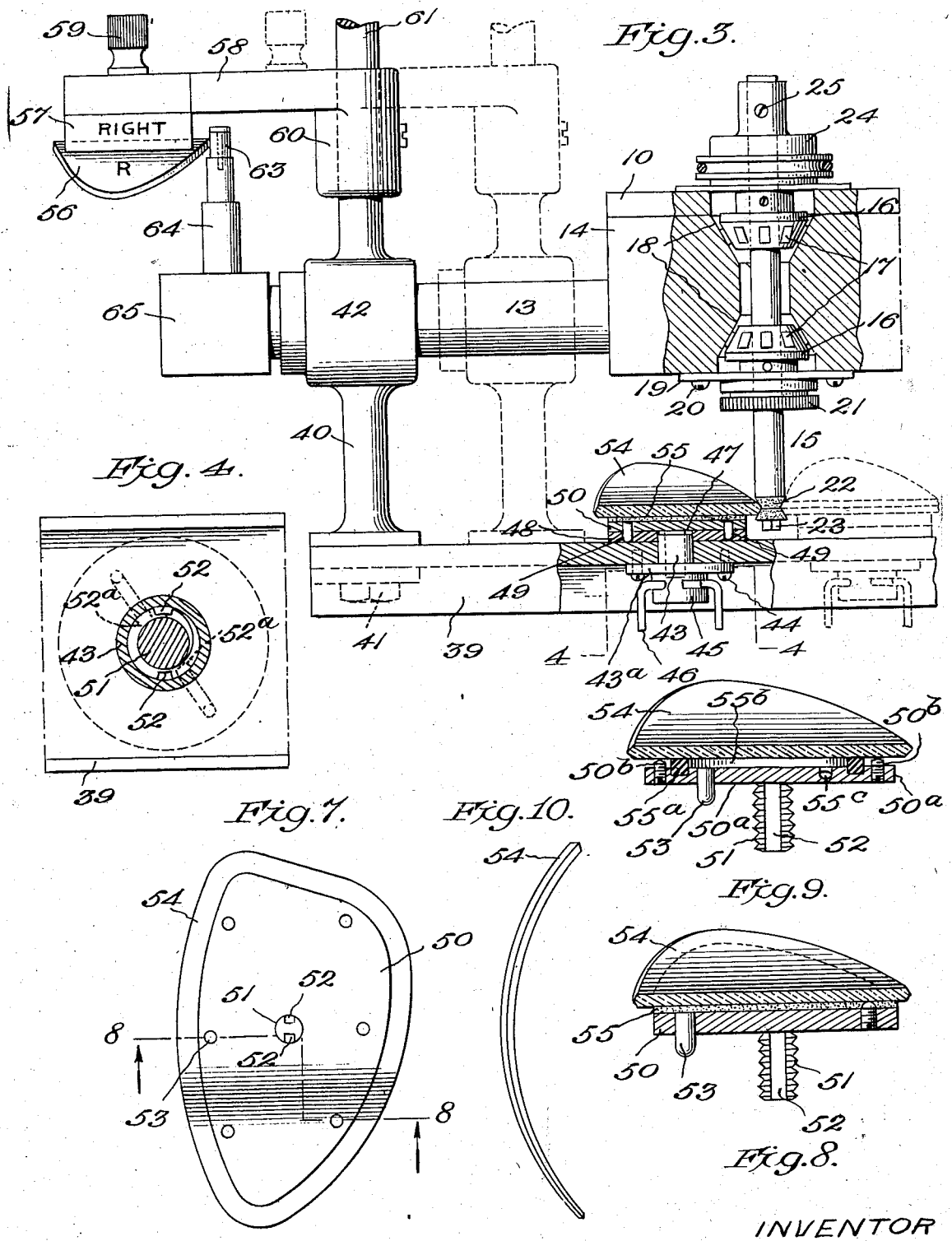

INVENTOR
ERNST O. KOLLMORGEN
BY
ATTORNEY

Patented Aug. 22, 1944

2,356,488

UNITED STATES PATENT OFFICE 2,356,488

MACHINE FOR BEVELING THE EDGES OF LENSES

Ernst O. Kollmorgen, Mountain Lakes, N. J.

Application June 30, 1942, Serial No. 449,065

3 Claims. (Cl. 51—100)

The invention relates to beveling the edges of lenses and more particularly the edges of lenses with concavo-convex cylindrical surfaces designed primarily for goggles of the type used to protect the eyes of the wearer, as exemplified for instance by the goggles worn by aviators and operators of other high speed vehicles.

Goggles of the indicated type are subjected to excessive air current or pressure and to other eye destructive forces when in use, and the lenses accordingly are required to fit accurately into the goggle-frames for which they are intended, to prevent such air current or pressure or other eye destructive forces from reaching the eyes of the wearer of the goggles. In many forms of such goggles the lenses are of tapering, unsymmetrical oval form and as such present difficulties in manufacture incidental to their special characteristics. Furthermore, the edges of such lenses, prior to the beveling thereof, are ground to produce a certain shape and dimensions in accordance with predetermined requirements, and such shape and dimensions must not be disturbed by the beveling operation.

The object of the invention is to provide a machine of novel and simple construction whereby the results desired are accurately attained and the previously ground edges of the lenses are beveled in an efficient and accurate manner without destroying the contour and dimensions of said lenses.

The invention contemplates further the provision of a machine of the indicated type which may be operated efficiently without requiring any special skill.

Other objects will appear from the description hereinafter and the features of novelty will be pointed out in the claims.

In the accompanying drawings, which illustrate an example of the invention without defining its limits, Fig. 1 is a side elevation of the novel machine;

Fig. 2 is a plan view thereof partly in section;

Fig. 3 is a fragmentary side elevation of the machine with parts in section;

Fig. 4 is a detail horizontal section on the line 4—4 of Fig. 3;

Fig. 7 is an inverted plan view showing a lens supporting pad for use in the machine, with a lens mounted thereon;

Fig. 8 is a sectional view on a somewhat enlarged scale, on the line 8—8 of Fig. 7 showing one method of attaching the lens to be beveled to its supporting pad;

Fig. 9 is a corresponding view illustrating another method of mounting said lens on a supporting pad;

Fig. 10 is an edge view of a lens showing the beveled edge thereof;

Fig. 11 is an enlarged detail sectional view of a section of the bevel-grinding member, and Fig. 12 is a diagrammatic section of means whereby the sections of the grinding member may be produced, and dressed subsequently to a period of use.

Figure 5:
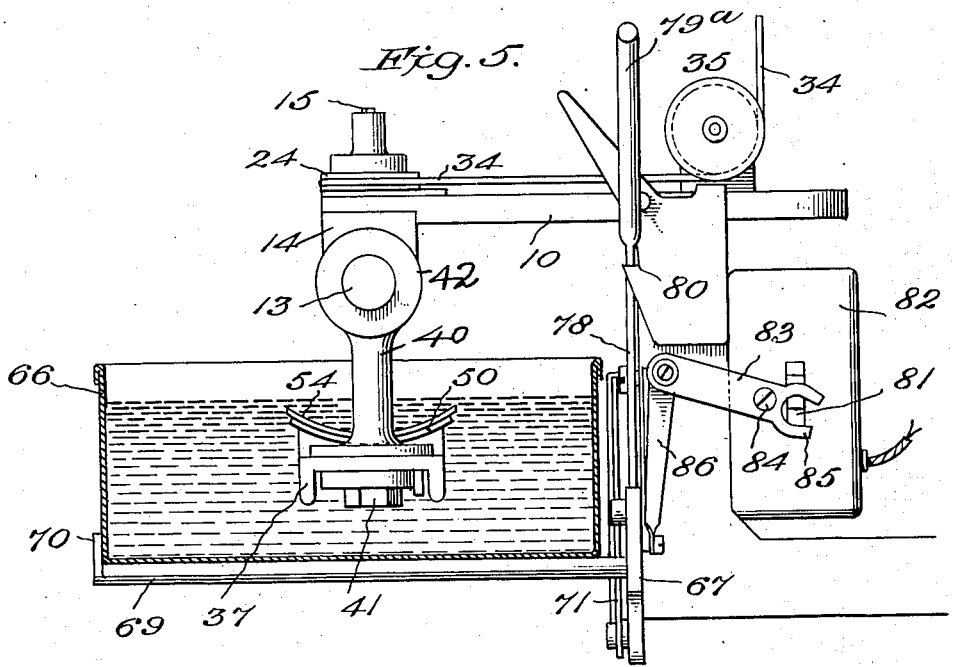
Fig. 5 is a cross-section on the line 5—5 of Fig. 2.

The machine in its illustrated form includes a stationary table 10 of suitable form and dimensions mounted upon the upright member of a supporting bracket 11 which in turn is fixed upon a supporting base 12 of any suitable type to locate the machine at a convenient level for control by the operator. Two coaxial rods 13 are suspended from the table 10 by means of blocks 14 so as to extend in parallel relation to the table 10 beneath the same and so as to project beyond said table in opposite directions at opposite sides thereof as shown in Fig. 2. It will be understood that the two coaxial rods 13 may be replaced by a single continuous rod suitably supported to provide the necessary rigidity, if this should be desired.

The table is provided with bevel-grinding means which, in the illustrated example, comprises three individual bevel-grinding devices. It will be understood that this number may be increased or diminished in dependence upon the output which is desired for the machine and the type of work to be done thereby.

Each bevel-grinding device comprises an upright shaft 15 provided with suitable anti-friction bearings, which for convenience are illustrated in the form of roller bearings 16 and rollers 17 of conventional type arranged in rolling engagement with bearing faces 18 with which the table is provided. Suitable means may be included in the machine for enabling each shaft 15 to be removed from the table 10 at will. Said means may be of any conventional form and as shown in the drawings consists of a plate 19 removably secured to the bottom of the block 14 by means of screws 20 and a control ring 21 adjustably connected with the shaft 15 as shown in Fig. 3. Each shaft 15 is mounted in perpendicular relation to the block 14 and projects upwardly and downwardly beyond the same as shown in Fig. 3. At its lower end each shaft 15 is provided with a grinding member 22 preferably consisting of two sections a of truncated conical shape in cross-section as illustrated in Fig. 11. The two sections a are fitted together in inverse relation to form a V-grooved grinding member 22 of the proper angle. Each section a of the bevel-grinding member 22 is preferably made of a mixture of suitable abrasive such as diamond powder and a suitable binder such as granulated thermo-plastic resin, it being understood that other suitable abrasives and binders may be used if preferred. The grinding member 22, as a unit, is of relatively small diameter which preferably does not exceed ¾" at its largest point. The bevel-grinding sections a of the grinding members 22 preferably are removably secured in associated relation on the associated shaft 15, for instance, by means of a screw 23. At its upper projecting end each shaft 15 carries a grooved pulley 24 of predetermined dimensions which may be fixed on said shaft 15 in any convenient manner as by means of a set screw 25.

The shaft or shafts 15, in whatever numbers these shafts may be mounted on the table 10, may be actuated by any suitable mechanism to rotatively drive the bevel-grinding members 22 at the desired speed. In the preferred arrangement in the case of an installation including a plurality of bevel-grinding members, the several shafts 15 are preferably driven from a single motive power, for instance, as shown in the drawings. In the illustrated arrangement, idler pulleys 24ª are rotatably mounted on the table 10 in cooperative relation to the pulleys 24, and to each other, for instance, in the manner illustrated in Fig. 2.

In the instant form of the machine, the source of power comprises an electric motor 26 carried by a support 27 from which a stud 28 projects downwardly into an upright pedestal 29 in which said stud is slidable so as to enable the motor 26 to be vertically adjusted to different positions as may be necessary for instance, to adjust the tension of the driving belt to be referred to later on. A suitable locking device 30 is provided for fixing the stud 28 and consequently the motor 26 in an adjusted position on the pedestal 29. The latter projects upwardly from the horizontal member of the bracket 11 to which it is secured in any convenient way as by screws 31, and is dimensioned to support the motor 26 at a distance above the table 10. The shaft 32 of the motor 26 carries a grooved pulley 33 the diameter of which in the illustrated example is larger than the diameter of the pulleys 24 and 24ª. An endless belt 34 passes over the pulley 33 of the motor 26 and beneath guide pulleys 35 on the table 10 and thence back and forth over the pulleys 24 and 24ª to thereby operatively connect the pulleys 24 with the driving pulley 33 of the motor 26. The pulleys 35, the axes of which extend in transverse relation to the axes of the pulleys 24 and 24ª, are rotatably mounted upon brackets 36 which preferably are adjustably fixed upon the table 10 in any convenient manner as by screws 37 and slots 38, as shown in Fig. 2. Because of the fact that in the arrangement shown in the drawings the belt 34 is subjected to flexing at a plurality of points, it is preferred to utilize a belt of considerable length and made of a material which will withstand such flexing for a maximum time period. In practice it has been found satisfactory to use belts corresponding to the linen belts customarily utilized in engraving machines, for the belt 34 although it will be understood that other forms of belt which possess the inherent properties required for satisfactory and continued operation may be substituted at will.

The machine further includes operating means whereby the edges of the lenses which are to be beveled are brought into contact with grinding members 22, means to move the lenses progressively in such manner as to produce a bevel around the periphery of the lenses, and means to control the motion of the lenses to limit the depth of the bevel so produced. In the illustrated example the operating means is manually actuated in association with the control means, it being understood that such manual operation may be replaced by automatic operation through the medium of suitable mechanism as will be readily apparent.

As shown on the drawings the operating means comprises a carrier 39, which is mounted on members 40. The members 40 extend in a common radial direction from bearings 42 which are mounted on the stationary rods 13, so as to be capable of being rotated thereon and slidably reciprocated lengthwise thereof.

A plurality of devices corresponding in number to the number of grinding members 22 included in the machine are provided on the carrier 39 for the purpose of mounting the lenses to be beveled in such position as to be acted upon by the respective grinding members 22.

In its illustrated form the lens mounting means comprises coupling sleeves 43 projecting upwardly through the carrier 39 and rotatably mounted in plates 43ª secured to the carrier 39 within the channel thereof by means of screws 44. The sleeves 43 terminate beneath the plates 43ª in heads 45 having operating members 46 of any suitable nature for facilitating the rotation of the heads 45 and the associated sleeves 43. The upper ends of the coupling sleeves 43 terminate in openings 47 formed in preferably circular members 48 which are fixed upon the upper surface of the carrier 39 in any convenient manner to constitute seats for the lenses to be bevelled as will appear more fully hereinafter. The members 48 in addition are provided with one or more recesses 49 adapted to cooperate with a lens mounting device for the purpose of fixing the lens in a predetermined position on the carrier 39. Each lens mounting consists of a supporting pad 50 from the lower face of which a threaded stem 51 projects in perpendicular relation thereto, said stem being provided with grooves 52 extending lengthwise thereof preferably at diametrically opposed points of said stem 51. The grooves 52 are designed to accommodate projections 52ª which extend inwardly from the inner surface of each sleeve 43 as shown by dotted lines in Fig. 4. Each pad 50 further includes one or more positioning studs 53 projecting downwardly beyond the lower surface of each pad 50 for cooperation with the recesses 49 of the associated circular member 48. The profile of each member 50 is preferably similar to but smaller than the peripheral shape of the lens 54 for which it is designed as shown in Fig. 7, and said member 50 is curved to correspond with the concavo-convex shape of said lens. Each lens 54 which is to be beveled is secured in place on the associated pad 50 preferably by means of a relatively thin film of pitch or other suitable attaching material 55, as illustrated in Fig. 8, or in any other suitable manner. For instance, as shown in Fig. 9, the lens 54 may be fixed in place on the associated pad 50ª, which corresponds to the pad 50, by suction. In such case, the lens 54 rests upon an annular gasket 55ª of suitable material so as to form therewith an enclosed space 55ᵇ as illustrated in Fig. 9. The space 55ᵇ is suitably connected with a source of suction, such as an air pump of conventional type, for instance by means of a channel 55ᶜ which in turn is operatively connected with said source of suction in any convenient manner. When the lenses 54 are held in place by suction, the pads 50ª need not be removable from the members 48, but instead, may be permanently fixed in proper place upon the carrier 39.

With this arrangement air is exhausted from the space 55ᵇ to form a vacuum therein, and thereby cause the atmospheric pressure effective on the lens 54 to hold it firmly in place on the gasket 55ª. To prevent undue compression of the latter and to properly position the lens 54 on the pad 50ª, the latter may be provided with screws 50ᵇ which contact the lens 54 from below and thereby stabilize said lens on said pad 50ª as will be apparent.

The dimensions of the pad 50 or 50ª, its mounting plate 48, the carrier 39 and the members 40, are so chosen that when the lens is attached to the pad and rotated about rods 13 by means of the mechanism provided for this purpose, all points on the apex of the bevel which is to be produced upon the lens shall be equidistant from the common axis of the rods 13. In the present instance the apex of the bevel on the lens is to be located midway between the lens surfaces; and hence, the lens must be so located that the radius of its rotation about the common axis of rods 13 is approximately equal to the arithmetical mean of the radii of the concave and convex surfaces of the lens. In this manner a bevel is produced which corresponds approximately to the cylindrical curvature of the lens.

It will be clear from Fig. 3 of the drawings that the relative motion between the lenses 54 and the grinding members 22 may alternatively be produced by rotating and sliding the block 14 and its associated elements relatively to the bearings 42 while keeping stationary the carrier 39 and all parts thereof including the lens 54.

The relative progressive travel between the lens 54 and grinding member 22, as for instance the progressive travel of each lens 54 relatively to the cooperating grinding member 22 in predetermined grinding contact therewith is controlled by means of a former 56 which preferably corresponds in shape to the shape of the lens or lenses 54 to be beveled and is preferably located an equal distance from the common axis of the rods 13. This former 56 may be made of metal or any other suitable material and is carried by a support 57 which is mounted upon an arm 58 preferably by means of a screw 59, as shown in Figs. 2 and 3. The arm 58 extends from and preferably forms an integral part of a collar 60 which is fixed upon the stem 61 projecting radially from one of the bearings 42 and terminating at its free end in the illustrated example in an operating knob 62. A control roller 63 is arranged to cooperate with the former 56 in the manner to be more fully set forth hereinafter, and is mounted upon a vertical stud 64 extending upwardly from a block 65 fixed upon the rod 13.

It will be seen that if the operating knob 62 is so manipulated as to cause the former 56 to travel around the roller 63 while remaining in contact therewith, the motion imparted to the lenses will produce the desired bevels thereon.

The former 56 may be otherwise than curved transversely in which case proper adjustments in the shape thereof may be required, said former 56 further being capable of being located at different distances from the block 65 in which case the shape and size of the former 56 will have to be adjusted correspondingly.

Similarly the diameter of the roller 63 may be varied to vary the depth of the bevels on the lenses and to compensate for wear on the grinding wheels 22.

The grinding or formation of the bevels on the peripheral edges of the lenses 54 preferably is carried on under water. To enable this to be efficiently accomplished, the machine includes a tank or container 66 which preferably is arranged so as to be capable of being adjusted to and from an operative position at will. Any suitable means may be provided for this purpose, the arrangement shown in Fig. 6 having been found satisfactory. In its illustrated form the adjusting means comprises levers 67 pivoted at 68 upon the upright member of the bracket 11 and carrying rods 69 constituting supports on which the tank or container 66 is adapted to rest as shown in Fig. 1. The rods 69 are provided with projections 70 which maintain the receptacle or tank 66 in place thereon. Links 71 are pivotally connected at 72 with the respective levers 67 and further are pivotally connected with each other and with a block 73 at 74, said block 73 being vertically slidable in a groove 75 formed in the upright member of the bracket 11. A link 76 has its one end pivotally connected with the pivot 74 and its other end pivotally connected at 77 with an operating member 78 fulcrumed at 79 upon the upright member of the bracket 11 and terminating at its free end in a handle 79ª. A holding latch or stop 80 is provided for cooperation with the member 78 to retain and fix the tank or receptacle 66 in its raised elevated position.

Figure 6:
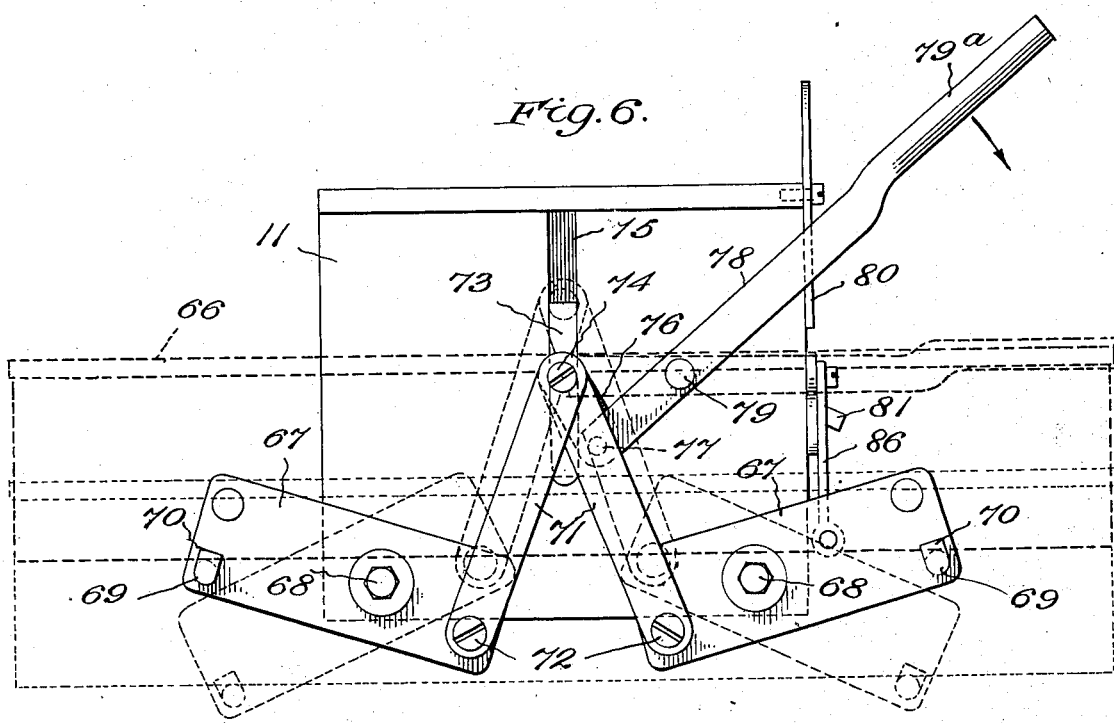
Fig. 6 is a fragmentary front view illustrating means for positioning the water-tank embodied in the machine.

The starting and stopping of the motor 26 is controlled by means of a switch 81 forming part of a switch box 82 and said switch 81 in turn is automatically adjusted to its "on" and "off" positions coincidentally with the adjustment of the tank or receptacle 66 to and from its operative position. This automatic control of the switch 81 is effected by means of an arm 83 pivoted at 84 upon the switch box 82 and having a forked end 85 which straddles the switch 81 as shown in Fig. 5. The arm 83 is operatively connected by means of a link 86 with one of the levers 67 as illustrated in Figs. 5 and 6. With this arrangement, as the lever 78 is pivotally actuated to adjust the tank or receptacle 66 to its inoperative position, the arm 83 will simultaneously be pivotally actuated to adjust the switch 81 to its "off" position and thereby break the electric circuit in which the motor 26 is located so that said motor accordingly will cease to operate. Conversely when the lever 78 is operated to raise the tank or receptacle 66 to its operative position, the arm 83 will coincidentally be actuated to adjust the switch 81 to its "on" position and thereby close said electric circuit to start the motor.

The aforesaid coincidental operation of the tank 66 and switch 81 constitutes a safety factor and makes it impossible for the machine to perform any grinding operation with the grinding members 22 in a dry condition.

It will be understood that the position of the lens or lenses 54 on the carrier 39 accurately corresponds to the position of the former 56 on the arm 58. In practice the former 56 bearing the designation "right" will be used in association with the beveling of the edges of right-hand lenses, while the former 56 correspondingly bearing the designation "left" will be utilized in connection with the left-hand lenses.

In the form illustrated, each lens 54 with its pad 50 or 50ª is coupled in place upon the carrier 39 by inserting the associated stem 51 into a sleeve 43 with the projections 52ª extending into the grooves 52 of the stem 51, and the stud or studs 53 of the pad 50 or 50ª projecting into the recesses 49 of a circular member 48. The sleeve 43 is then rotated on its axis by means of the members 46 to cause the projections 52ª to engage the threads of the stem 51 whereby the pad 50 or 50ª will be firmly drawn against the associated circular member 48 to thereby firmly secure said pad 50 or 50ª and with it the lens carried thereby in place on the carrier 39. Obviously any other means suitable for the purpose may be substituted for coupling the pads 50 or 50ª with the lenses carried thereby on the carrier 39, if desired.

The connection of the lenses with the carrier 39 may be easily effected with the carrier 39 in the position indicated by dotted lines in Fig. 1. To facilitate this operation, the machine may include means for temporarily locking said carrier 39 in said dotted line position. The aforesaid locking means is shown in the form of a detent or catch 87 rotatably mounted on the table 10 and operated by means of a head or knob 88. By rotating the latter the detent 87 is adjusted over the stem 61 to hold the carrier 39 in the aforesaid dotted line position, it being understood that the bearings 42 are slidably shifted on the rods 13 to bring said stem 61 within the operative range of said detent 87 when said locking is desired. After the connection of the lenses with the carrier 39 has been completed, the latter is adjusted to proper position to start the grinding operation and the tank or receptacle 66 which previously has occupied its inoperative position, is raised to its operative position in which the lenses 54 and the grinding members 22 are submerged in the water contained in said tank or receptacle as shown in Fig. 5. As the tank or receptacle 66 is thus lifted, the switch 81 will be coincidentally actuated in the manner previously described to start the motor 26 and to thereby rotatively operate the grinding members 22. Because of the relative difference between the diameters of the driving pulley 33 and the pulleys 24 and 24ª, the grinding members 22 will be driven at relatively high surface speed.

The operator by means of the handle 62 now brings the peripheral edge of the former 56 into engagement with the roller 63 and thereby brings a corresponding portion of the peripheral edge of lens 54 into engagement with the associated grinding member 22. As the carrier 39 is capable of being rocked on the rods 13 and moved longitudinally relatively thereto, the operator simply moves the peripheral edge of the former 56 progressively in contact with the roller 63 and thereby progressively shifts the edges of the lenses 54 in exact corresponding relation to the respective grinding members 22. In this way the grinding contact of the lens edges with the grinding members 22 will be positively predetermined and the grinding members 22 will gradually and progressively bevel the edges of said lenses 54 in an accurate and uniform manner without any alteration in the dimensions or profiles thereof. The speed of this controlling operation, that is the adjustment of the former 56 relatively to the roller 63 is controlled in such a manner that the beveling operation of the grinding member 22 will be performed in a most efficient manner. When the beveling of the edges of the lenses has been completed, the tank or receptacle 66 is lowered to its inoperative position to thereby automatically throw the switch to its "off" position and arrest the operation of the motor 26 and consequently of the grinding members 22. The carrier 39 may then be swung to the dotted line position shown in Fig. 1 to permit the ready removal of the completely beveled lenses.

As previously stated, the operation of the former 56 relatively to the roller 63 may be effected automatically by means of suitable mechanism. In either case the machine operates to produce the beveled edge on the lenses without destroying the dimensional accuracy thereof or without destroying the contour of said lenses in any way. The machine is particularly adapted for beveling the edges of concavo-convex lenses intended for use in goggles designed to protect the eyes of the wearer against eye destructive forces as exemplified by excessive air currents or pressures.

In the preferred form the truncated conical sections $a$ of the grinding members 22 comprise a mixture of diamond powder and granulated thermoplastic resin, for instance in the proportion of one part diamond powder by weight and three parts granulated resin by weight. The sections $a$ are shaped in the presence of heat for instance 212° F. and under a pressure, for instance, of 300 lbs. per square inch.

The shaping and production of the sections $a$ may be accomplished in any suitable manner as for instance by means of the press diagrammatically illustrated in Fig. 12.

The press, as shown, may comprise a female member 87ª provided with a molding recess 88ª in which the mixture for forming the sections $a$ is contained. Pressure is exerted on said mixture by a male pressure member 89 suitably operated and controlled in any convenient manner. A core 90 extends axially through the members 87ª and 89, and through the recess 88ª and serves to form the axial opening $b$ in the sections $a$.

After the grinding members 22 have been in active use for a time period, the active surfaces of the sections $a$ become worn for instance as indicated by the dotted lines $c$ in Fig. 11. It accordingly becomes necessary to periodically restore the surfaces of said sections $a$ to their initial shape in order to restore the efficiency thereof.

This restoration of said sections to their initial shape may be accomplished by means of a diamond or in any other conventional way, or, as is preferred, the press shown in Fig. 12 may be utilized for this purpose. In such case, a section $a$ is placed in the recess 88ª, resin and abrasive being added, as necessary, and pressure is applied thereto by the member 89 in the presence of heat. The heat softens the sections $a$ and the applied pressure re-molds the same in the recess 88ª to thereby restore the grinding surfaces of said sections to their initial condition ready for further service.

If desired, the pads 50 or 50ª may be provided with suitable indicating marks corresponding to similar marks on the surface of the lens 54 to predetermine the position of the latter on said pads. Alternately, a jig or other device may be employed to position the lens accurately upon the pad 50 or 50ª, prior to its being affixed thereto in the manner indicated.

Although the present invention has been described in conjunction with a preferred embodiment thereof, it is to be understood that modifications and variations may be resorted to without departing from the spirit and scope of the invention, as those skilled in the art will readily understand. Such variations and modifications are considered to be within the purview and scope of the claims.

I claim:

1. A machine for beveling the edges of lenses comprising a stationary table, a plurality of upright grinding shafts rotatably carried by said table and projecting beyond the same in opposite directions, grooved grinding members of relatively small diameter mounted on said shafts beneath said table, operating pulleys fixed on said shafts above said table, a plurality of idler pulleys rotatably mounted on said table in associated relation with said operating pulleys and with each other, a relatively high upright pedestal extending above said table in contiguous relation thereto, an electric motor mounted on said pedestal at a level materially above said table, and including a drive shaft, a driving pulley fixed on said drive shaft, an endless belt passing over all of said pulleys whereby said grinding shafts and grinding members are operatively rotated, movable means for removably supporting a plurality of lenses, means whereby said movable means is operated to progressively adjust the edges of said lenses in grinding contact with said grinding members to progressively bevel said edges, and control means whereby the progressive grinding contact of said lens edges with said grinding members is predetermined.

2. A machine for beveling the edges of lenses comprising a stationary table, a plurality of upright grinding shafts rotatably carried by said table and projecting beyond the same in opposite directions, grooved grinding members of relatively small diameter mounted on said shafts beneath said table, means for operating said grinding members, means for removably supporting a plurality of lenses, means whereby said lens supporting means is operated to progressively adjust the edges of said lenses in grinding contact with said grinding members to progressively bevel said edges, and control means whereby the progressive grinding contact of said lens edges with said grinding members is predetermined.

3. A machine for beveling the edges of lenses having concave and convex surfaces in eccentric relation to each other, comprising bevel-grinding means, a carrier slidable linearly and pivotally movable, a plurality of devices for clamping the concavo-convex lenses to be beveled in place on said carrier with the radius of the pivotal movement of each lens approximately equal to the arithmetical mean of the radii of said concave and convex surfaces of the lenses, means for operating said carrier to progressively adjust the edges of all of said lenses simultaneously in grinding contact with said bevel-grinding means, a control roller, and a former having a profile corresponding to the profile of each of said lenses and cooperating with said control roller to predetermine the progressive grinding contact of the edges of all of said lenses with said bevel-grinding means.

ERNST O. KOLLMORGEN.